Jan. 25, 1966  C. A. MATTSON  3,231,199
LAWN SPRINKLER
Filed Aug. 19, 1963  5 Sheets-Sheet 1
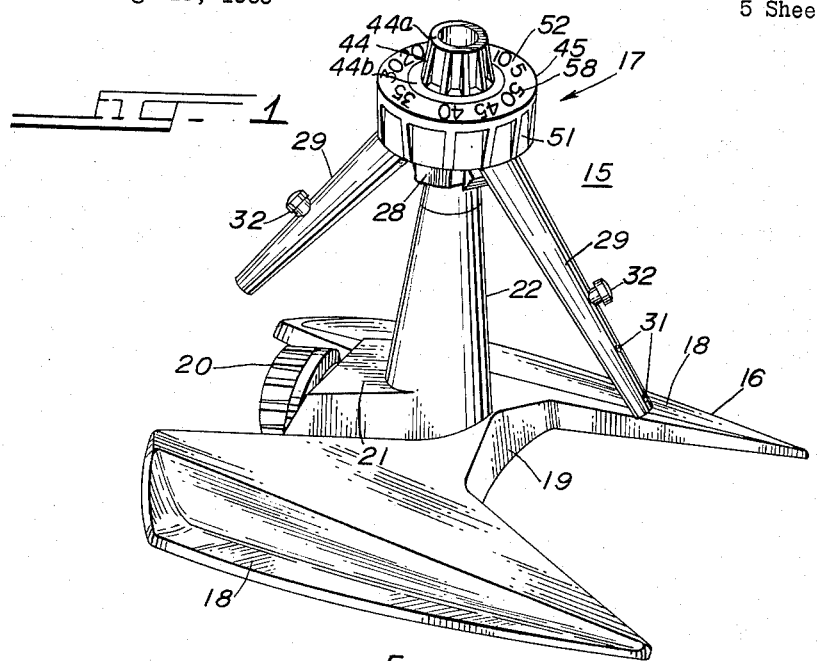
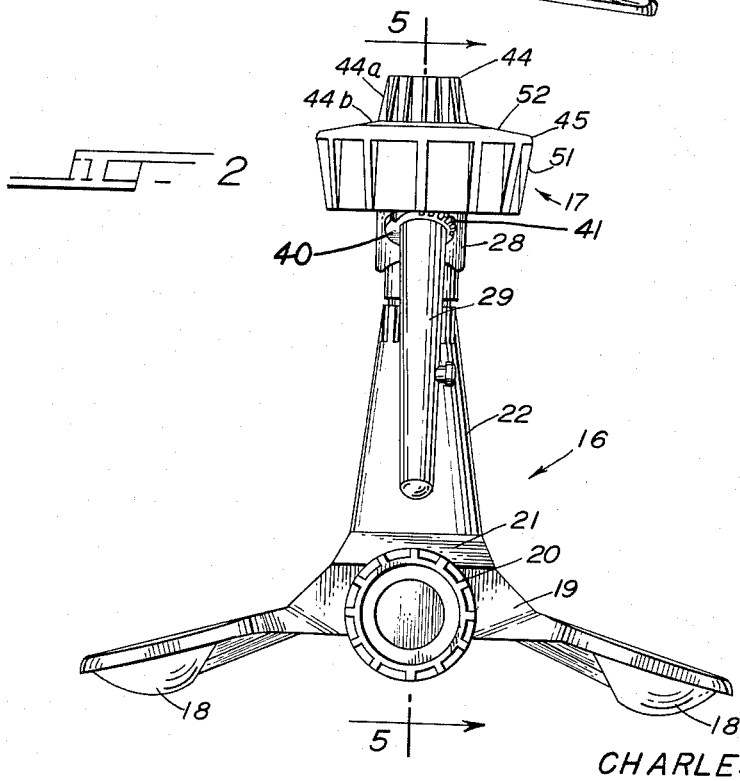
INVENTOR.
CHARLES A. MATTSON
BY George R. Clark
ATTY.

Jan. 25, 1966  C. A. MATTSON  3,231,199
LAWN SPRINKLER
Filed Aug. 19, 1963  5 Sheets-Sheet 2

INVENTOR.
CHARLES A. MATTSON
BY George R. Clark
ATTY.

Jan. 25, 1966     C. A. MATTSON     3,231,199
LAWN SPRINKLER
Filed Aug. 19, 1963     5 Sheets-Sheet 3
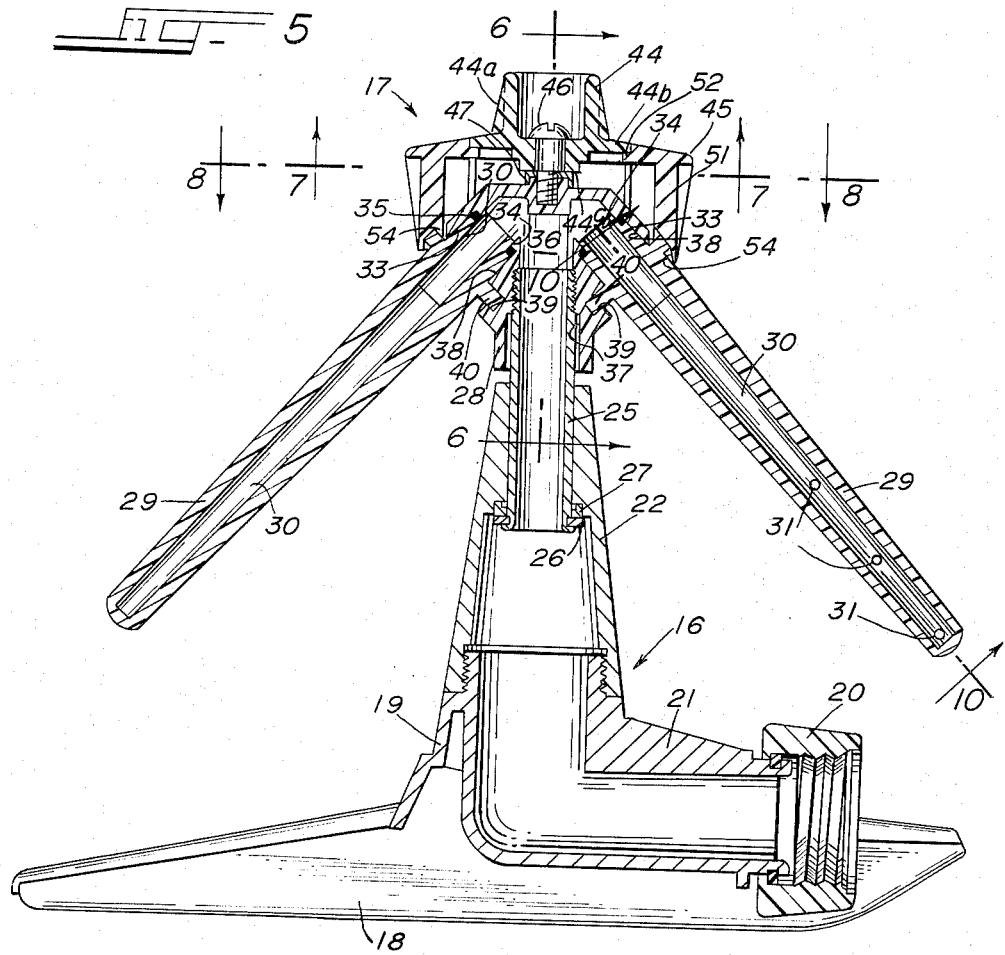
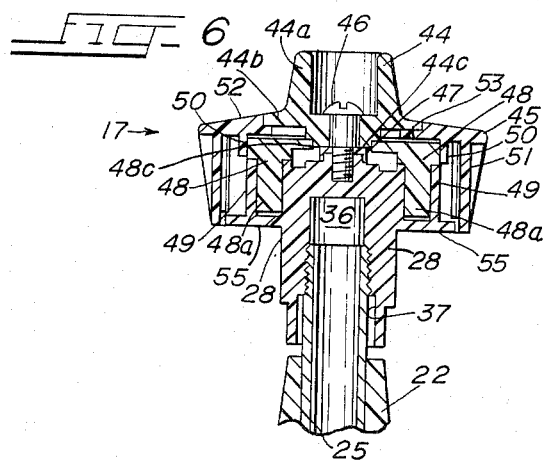
INVENTOR.
CHARLES A. MATTSON
BY George R. Clark
ATTY.

Jan. 25, 1966   C. A. MATTSON   3,231,199
LAWN SPRINKLER
Filed Aug. 19, 1963   5 Sheets-Sheet 4

INVENTOR.
CHARLES A. MATTSON
BY George R. Clark
ATTY.

Jan. 25, 1966   C. A. MATTSON   3,231,199
LAWN SPRINKLER
Filed Aug. 19, 1963   5 Sheets-Sheet 5
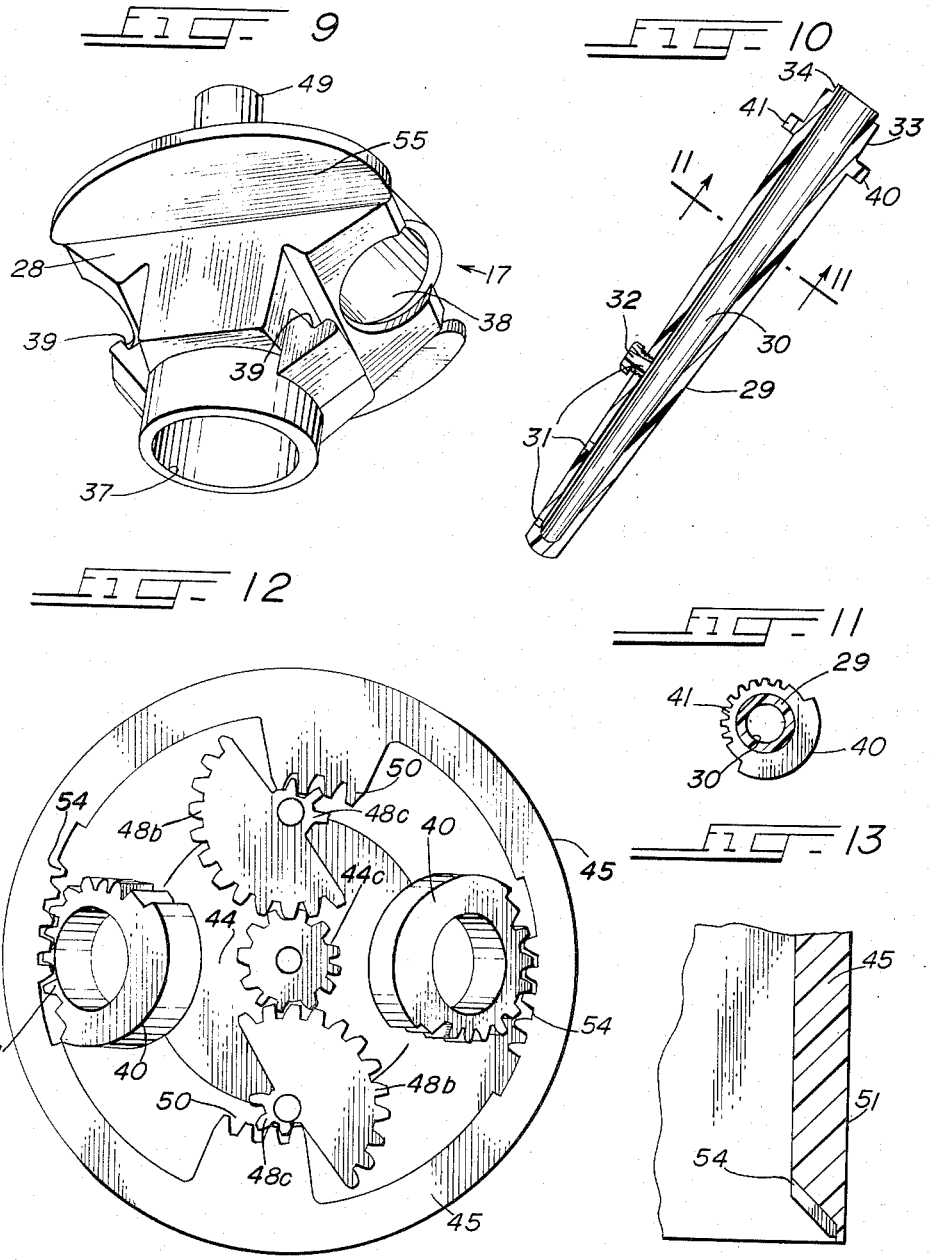
INVENTOR.
CHARLES A. MATTSON
BY
George R. Clark
ATTY.

United States Patent Office 3,231,199
Patented Jan. 25, 1966

3,231,199
LAWN SPRINKLER
Charles A. Mattson, Oak Park, Ill., assignor to Sunbeam Corporation, Chicago, Ill., a corporation of Illinois
Filed Aug. 19, 1963, Ser. No. 302,936
15 Claims. (Cl. 239—253)

The present invention relates to lawn sprinklers, and, more particularly, to lawn sprinklers of the type having a head rotated by the reaction of the water sprayed therefrom and having adjustable spray means to vary the area of the lawn being sprinkled.

The invention represents an improvement over the sprinklers disclosed in U.S. Patents 2,335,281 and 2,591,073 assigned to the same assignee as the instant invention. While the sprinklers disclosed in these patents represent simple and effective mechanisms for watering a lawn, the trend toward less complicated and less expensive sprinklers has pointed up a need for further improvements in this sprinkler if it is to continue to be sold in large quantities. Many of the consumers are unsophisticated in evaluating the attributes or advantages of the present day sprinkler and base their purchases on price considerations alone. There are, of course, many purchasers who appreciate the advantages of the rotary head adjustable arm sprinkler of the type disclosed in the above-cited patents. These more sophisticated purchasers recognize desirability of the even water distribution possible in this type of sprinkler as well as the flexibility permitted by the wide range of areas which may be sprayed with this sprinkler. It would be desirable, therefore, to provide a rotary head adjustable arm sprinkler having the functional advantages of the sprinklers disclosed in the above-cited patents while at the same time being structurally simple enough to compete with the low cost sprinklers which are now flooding the market place.

It is accordingly an object of the present invention to provide a new and improved sprinkler of the type having a water reaction rotated head with adjustable spray tubes to vary the spray pattern.

Another object of the invention is to provide a simplified rotary head sprinkler having an improved means for adjusting the position of the spray tubes with respect to the rotatable head.

A further object of the present invention is to provide a sprinkler having a simplified water sealing arrangement for the adjustably mounted spray tubes and having the adjustment means for the spray tubes entirely external of the water containing portions of the head.

Further objects and advantages of the present invention will become apparent as the following description proceeds and the features of novelty which characterize the invention will be pointed out with particularity in the claims annexed to and forming a part of the specification.

For a better understanding of the present invention, reference may be had to the accompanying drawings, in which:

FIG. 1 is a perspective view of a sprinkler embodying the present invention;

FIG. 2 is an enlarged front elevational view of the sprinkler shown in FIG. 1;

FIG. 5 is a vertical sectional view of the sprinkler taken on line 5—5 of FIG. 2;

FIG. 6 is a fragmentary sectional view taken on line 6—6 of FIG. 5;

FIG. 9 is a perspective view of a portion of the sprinkler head;

FIG. 10 is a sectional view of the sprinkler spray tube taken on line 10—10 of FIG. 5;

FIG. 11 is a sectional view of the sprinkler spray tube taken on line 11—11 of FIG. 10;

FIG. 12 is a schematic showing of the gearing which interconnects the control knob and the spray tubes of the sprinkler; and FIG. 13 is a fragmentary sectional view of the head adjustment ring taken on line 13—13 of FIG. 8.

Figure 3:
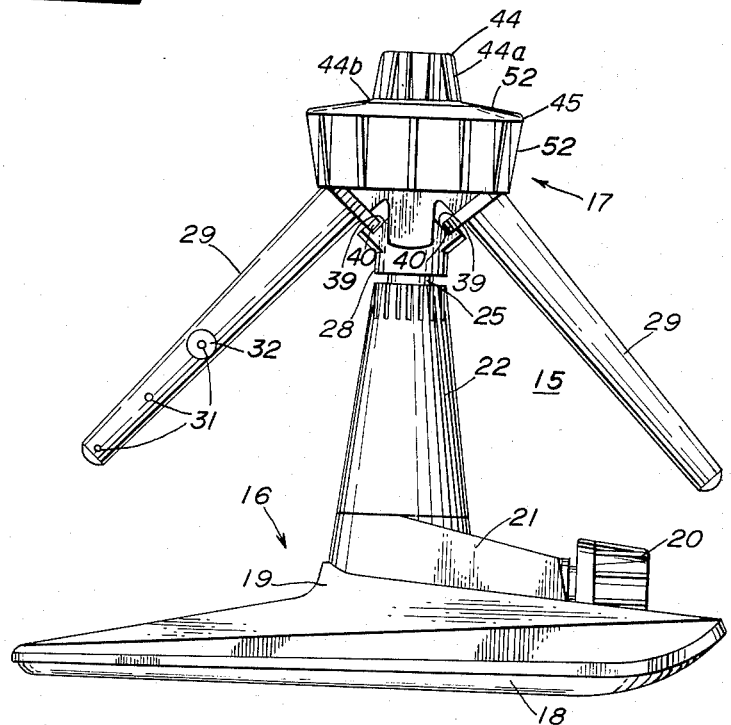
FIG. 3 is an enlarged side elevational view of the sprinkler shown in FIG. 1.
Figure 4:
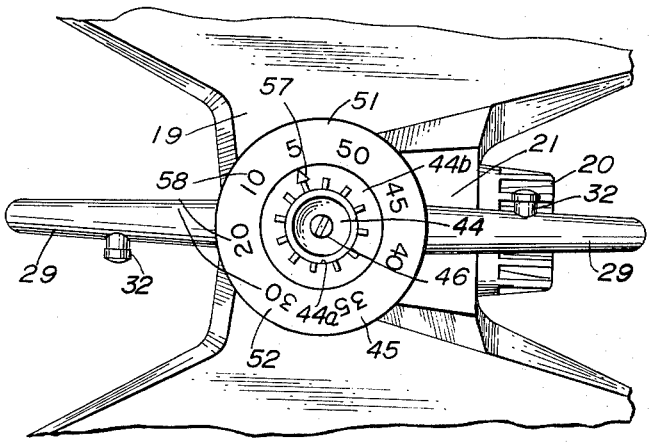
FIG. 4 is an enlarged fragmentary plan view of the sprinkler of the present invention.

Briefly, the invention is concerned with a simplified means of mounting the spray tubes in the head of a rotary sprinkler and the means for adjusting the positions of the spray tubes by a single control knob. In the above-cited Patent No. 2,591,073, a control knob is connected to a small spur gear which drivingly engages gears staked on the ends of the spray tubes to adjustably position the spray tubes with respect to the rotating head. In such an arrangement, all the gearing is enclosed in a large sealed chamber through which the water moves in passing to the spray tubes. In the instant invention, the gearing interconnecting the spray tubes and the control knob is all positioned externally of the water containing portions of the head. This arrangement of the gearing permits a simplified head which requires no seals other than the annular seals for the spray tubes. There is also provided a simplified mounting for the spray tubes wherein no separate assembly parts are required.

Referring to the drawings, there is shown a rotary head sprinkler designated generally by reference numeral 15 which includes a base 16 and a head 17 mounted for rotation about a vertical axis. The base 16 includes a pair of spaced parallel ground engaging runners 18 and a central platform portion 19. Positioned between the runners 18 and extending from one end of the platform portion 19 is a hose coupling 20 which is received on the outer end of a base conduit 21 formed integrally with the platform portion 19. Extending upwardly from the platform portion 19 and in communication with the conduit 21 is a vertical conduit or support member 22 which may be in threaded engagement or otherwise secured to the platform 19.

The head 17 is rotatably supported on the upper end of the vertical conduit 22 by means of a downwardly extending bearing 25 which may comprise a bronze sleeve threadedly received in the head 17 at its upper end and provided with a thrust washer 26 staked to the lower end thereof. A suitable thrust bearing 27 is press fitted into the vertical conduit 22 for bearing engagement with the thrust washer 26.

The head 17 is made up of a head member 28, in which the head bearing 25 is threadedly received, and a pair of outwardly and downwardly extending spray tubes 29. Each of the spray tubes 29 consists of an elongated, tapered plastic tube having an internal passageway 30 which communicates with the interior of the head member 28. Along the length of the spray tube, there are a number of aligned nozzle openings 31. The uppermost nozzle opening is formed by a nozzle member 32 having a longer bore than wall openings forming the other nozzles to obtain a greater spray distance than is obtained by simply providing holes in the wall of the spray tube 29. The upper end of each spray tube 29 is formed with a cylindrical bearing portion 33 and a stepped gasket supporting extension 34. The extension 34 is provided with an O- ring sealing gasket 35 which serves to prevent leakage between the head member 28 and the spray tubes 29.

The internal passageways 30 in the spray tubes 29 are in communication with a cavity or chamber 36 in the head member 28. The chamber 36 is also in fluid communication with the base conduit 21 by means of the hollow head bearing 25 which extends upwardly into an opening 37 in the bottom of the head member 28. To support the spray tubes 29, the head member 28 is provided with cylindrical passageways 38 which extend outwardly and downwardly from the chamber 36 and journal the spray tube bearing portions 33 therein. The cylindrical passageways 38 terminate in shoulders which abut the gaskets 35 in an axial direction while the gaskets are compressed radially between the spray tube bearing portions 33 and the passageways 38.

For the purpose of retaining the spray tubes in their assembled position within the passageways 38, there is provided on the head member 28 a pair of slots 39 which are located immediately adjacent the ends of the head passageways 38. The spray tubes 29 are formed with annular shoulders 40, which shoulders are received within the slots 39. Positioned approximately coplanar with each annular shoulder 40 is a gear sector 41 on each of the spray tubes 29. As may best be seen in FIG. 11, the gear sectors 41 are of smaller diameter than are the annular shoulders 40. This reduced diameter of the gear sector 41 permits the spray tube 29 to be rotated to a position in which the gear sector is adjacent the slot 39 whereby the spray tube may be moved axially and disassembled from the head member 28. Similarly, the spray tube 29 may be assembled to the head 28 in the same manner. During operation, however, as will be explained in greater detail below, the shoulders 40 are maintained in engagement with the slots 39 to retain the spray tubes 29 in assembled relation to the head member 28.

To control the position of the spray tubes 29, there is provided on the top of the head 17 a control knob 44 and an adjustment ring or cap 45. The control knob 44 includes a cylindrical gripping portion 44a, the outer edge of which is ribbed to permit the control knob 44 to be adjusted even when wet. At the base of the gripping portion 44a, there is formed an outwardly extending flange 44b which engages and serves as a rotary bearing for the adjustment ring 45. The control knob 44 is secured to the head member 28 by means of a shoulder screw 46 which seats against a washer 47 to provide an accurate clearance so that the control knob may rotate freely with respect to the head member 28 on the screw 46. Integrally formed on the lower end of the control knob 44 is a spur gear 44c.

Figure 7:
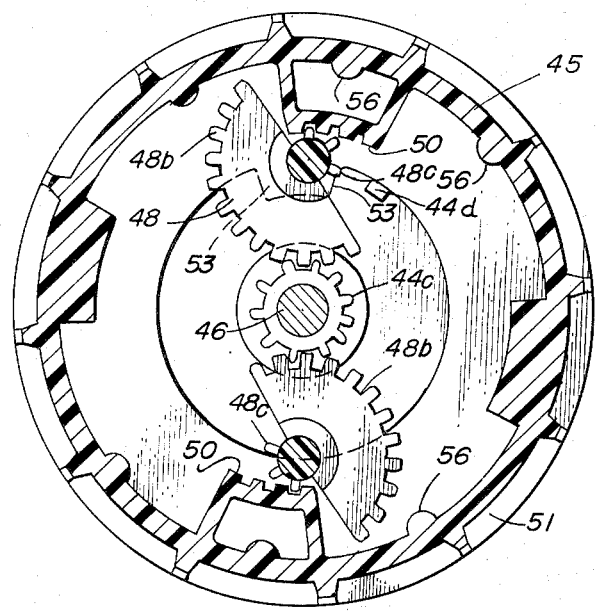
FIG. 7 is an enlarged sectional view taken along line 7—7 of FIG. 5.

To drivingly interrelate the control knob 44 and the adjustment ring 45, a pair of gear members 48 are supported for rotation on the head member 28. The head member is formed with cylindrical recessed bosses 49 within which bearing portions 48a of the gear members 48 are received. As is best shown in FIG. 7, the gear members 48 are provided with two spur gears 48b and 48c, 48b being the larger of the two gears which is in driven engagement with the control knob gear 44c. The gears 48b and 48c are substantially coplanar with each extending only about 180 degrees around the axis of the gear member 48.

The adjustment ring or cap 45 is formed with small internal gear segments 50 as is best shown in FIG. 7. The gear segments 50 are in driven engagement with the spur gears 48c formed on the gear members 48. As should be evident from FIG. 7, rotation of the control knob gear 44c causes rotation of the adjustment ring or cap 45 by virtue of the gear member 48 and its spur gears 48b and 48c which drivingly relate the control knob gear 44c and the adjustment ring gear segments 50. As is evident from the relative numbers of teeth in gears 48b and 48c, there will be a large gear reduction between the control knob and the adjustment ring 45. The gear ratio has been selected so that there will be a very small rotation of the ring 45 as the control knob 44 is rotated through almost 360 degrees.

The adjustment ring 45 includes a cylindrical outer wall 51 which is ribbed, as is the control knob 44, to prevent slipping when operated while the sprinker is wet. Extending inwardly from the upper edge of the cylindrical wall 51 is a flange 52 which is stepped at its inner edge to provide a bearing ledge which engages the flange 44b of the control knob. The stepped edge of flange 52 guides the adjustment ring 45 for rotation about the same axis as the control knob 44 and retains the ring 45 assembled to the head member 28 by virtue of its engagement with the underside of the control knob flange 44b.

To limit the amount of relative rotation between the control knob 44 and the adjustment ring 45, the adjustment ring is provided with a stop 53 which extends inwardly from the lower edge of flange 52 as may best be seen in FIGS. 6 and 7. The control knob 44 is also provided with a downwardly extending stop 44d as may be seen in FIG. 7. As the control knob is rotated in one direction, the stop 44d engages one side of the stop 53 and when rotated in the other direction, the stop 44d engages the other side of the stop 53. This limits rotation of the knob 44 to approximately 315 degrees with respect to the adjustment ring 45.

To connect the adjustment ring 45 with the spray tubes 29, there are provided bevelled or angled gear segments 54 on the adjustment ring 45. The gear segments 54 are in driving engagement with the gear sectors 41 formed on the spray tubes 29. Thus, as the control knob 44 and the adjustment ring 45 are rotated relative to each other, the adjustment ring 45 will rotate with respect to the head member 28 causing the gear segments 54 to rotate with respect to the head member 28. This rotation of the gear segments 54 causes the spray tubes 29 to be rotated about their axes by virtue of the engagement between the gear segments 54 and the gear sectors 41. The arrangement of the gearing is best shown in FIGS. 7 and 8 and the schematic showing in FIG. 12.

It should be appreciated that the annular shoulders 40 on the spray tubes 29 remain in engagement with the slots 39 through the entire range of movement permitted in the spray tube adjustment means by the stops 53 and 44d provided on the adjustment ring 45 and the control knob 44, respectively. As a consequence, the spray tubes are securely assembled to the head member 28. When it is necessary to disassemble the device, removal of the single screw 46 permits all the parts to be detached from the head member 28. Once the adjustment ring 45 has been removed, the spray tubes 29 may be rotated to disengage shoulders 40 from slots 39 to permit their axial movement out of passageways 38.

Figure 8:
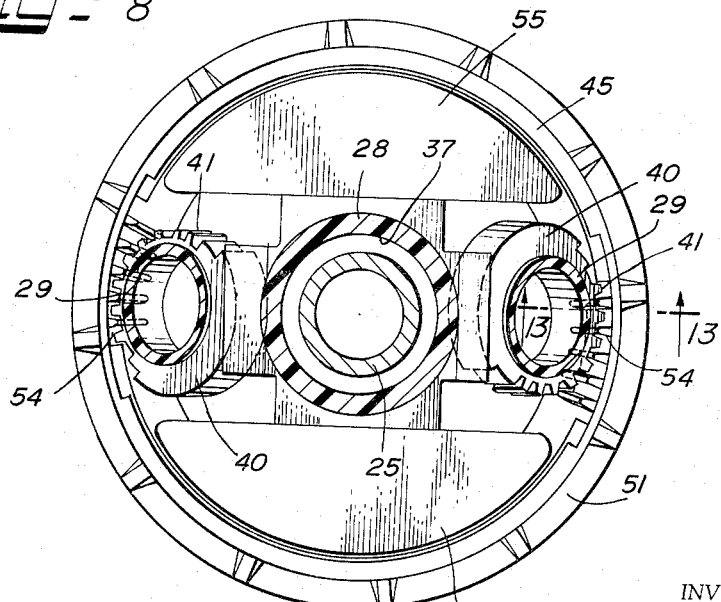
FIG. 8 is a sectional view taken substantially on line 8—8 of FIG. 5.

To complete the support of the adjustment ring 45, the head member 28 is formed with a pair of horizontally disposed, generally semicircular guides or discs 55 which extend outwardly from the lower portion of head member 28 and engage the inner diameter of the adjustment ring 45 as is best shown in FIGS. 6, 8 and 9. The guides 55 cooperate with the control knob 44 to support the adjustment ring 45 for rotation with respect to the head member 28. The adjustment ring 45 is also provided with a plurality of internal ribs 56 which extend vertically downwardly from the ring flange 52 to a point immediately above the guides 55. The lower ends of the ribs 56 engage the guides 55 and tend to restrain the ring 45 against twisting or tipping with respect to the head member 28.

As may best be seen in FIGS. 1 and 3, the knob 44 and the adjustment ring 45 are provided with cooperating indicia to give an indication of the setting of the spray tubes 29. In the illustrated embodiment, there is an arrowhead 57 provided on the flange 44b of the control knob 44 and suitable numerical indicia 58 on the flange 52 of the adjustment ring 45. The numercial indicia 58 show the diameter of the spray pattern for any particular setting of the spray tubes 29. Thus, if the arrowhead 57 is aligned with the numeral 35, the spray tubes would be positioned to deliver water over a circular area approximately 35 feet in diameter. Similarly, when the relative position of the control knob and adjustment ring are changed so that the arrowhead 57 is adjacent or pointing to any of the other numerals appearing on the flange 52, the spray tubes would be positioned to deliver water to an area corresponding in diameter to the indicated numeral.

To operate the adjusting mechanism on the sprinkler 15, the adjustment ring 45 is grasped by the fingers of one hand and the control knob 44 is grasped by the fingers of the other hand and the knob 44 and the ring 45 are rotated relative to each other until the arrowhead 57 is aligned with the desired numeral. The gear reduction introduced through the gear member 48 makes this relative rotation between the knob 44 and the ring 45 very easy to accomplish.

The sprinkler described above is simple in construction and, at the same time, includes all the functional advantages inherent in the sprinkler disclosed in the above-cited Patent No. 2,591,073. The single shoulder screw 46 is the only assembly means necessary to retain the head member 28, the spray tubes 29 and the entire control mechanism in assembled relation. In addition, by providing an arrangement in which the open ends of the spray tubes 29 extend directly into a chamber 36 integrally formed in the head member, the sealing problems presented are reduced to a minimum. It is necessary only to provide simple O-ring seals to prevent leakage between the head member 28 and the spray tubes 29. The resulting construction is simple to assemble and very inexpensive to manufacture.

While there has been illustrated and described a particular embodiment of the present invention, it will be understood that changes and modifications may occur to those skilled in the art and it is, therefore, contemplated by the appended claims to cover all such changes and modifications as fall within the true spirit and scope of the present invention.

What is claimed as new and desired to be secured by Letters Patent of the United States is:

1. A sprinkler comprising a base, a head mounted on said base for rotation about a vertical axis, a pair of elongated spray tubes carried by said head and extending from opposite sides thereof, means mounting each spray tube for rotation about an axis extending lengthwise of said tube, means providing fluid communication between said head and spray tubes, a gear sector formed on each of said tubes, an annular adjustment ring rotatably supported on said head, internal gear means formed on said ring and engageable with said gear sectors outside of said head, and means for rotating said head with respect to said ring to rotate said spray tubes.

2. In a lawn sprinkler of the type having a head rotatably supported on a base, the improvement comprising a head member having a vertically extending conduit connected at its upper end to two outwardly and downwardly extending passageways, a spray tube journaled in each of said outwardly extending passageways with an open end of each spray tube in communication with each passageway, a gear sector formed on each of said tubes outside of but adjacent to the ends of said passageways, a cup-shaped cap carried by said head and rotatable with respect to said head member, said cap having internal gear means in engagement with each gear sector, and means for rotating said cap with respect to said head member to adjustably position said spray tubes.

3. In a lawn sprinkler of the type having a head rotatably supported on a base, the improvement comprising a head member having a vertically extending conduit connected at its upper end to two outwardly and downwardly extending passageways, a spray tube journaled in each of said passageways with an open end of each spray tube in communication with each passageway, a gear sector formed on each of said tubes outside of but adjacent to the ends of said passageways, a retaining shoulder on each said spray tube extending partially around the periphery thereof, an assembly slot formed on said head member adjacent each said passageway, each said shoulder being receivable in one of said slots to restrain said spray tubes against movement out of said passageways, and spray tube adjustment means rotatably mounted with respect to said head member and having internal gear means engageable with said gear sector to rotate said spray tubes.

4. The lawn sprinkler of claim 3 wherein the retaining shoulder and the gear sector for each spray tube are in the same plane with said gear sector being of smaller radius than said shoulder so that said gear sector will clear the means defining said assembly slot as each spray tube is moved axially into said passageway for assembling each said spray tube to said head member.

5. A sprinkler comprising a base supporting a head for rotation thereon, a spray tube journaled in said head for rotation about its axis, a control knob and an adjustment ring supported on said head for rotation with respect to said head about a common axis, gear means drivingly interconnecting said knob and said ring, and means on said ring engaging said spray tube to rotate and adjustably position said spray tube with respect to said head.

6. The sprinkler of claim 5 wherein said ring is formed with an internal gear and said spray tube includes a sector gear in driven engagement with said internal gear.

7. The sprinkler of claim 5 wherein said gear means provides a gear reduction between said knob and said ring.

8. In a sprinkler of the type having a head rotatable about a vertical axis and spray tubes extending from said head adjustably mounted for rotation about their axes to vary the spray pattern, an improved spray tube adjusting means comprising an adjusting ring rotatably supported by said head and having two sets of internal gears, gears provided on said spray tubes for engagement with one of said sets of internal gears, a control knob rotatably mounted on said head and having a spur gear formed thereon, means drivingly interconnecting said spur gear and the other of said sets of internal gears whereby rotation of said knob with respect to said head rotates said spray tubes.

9. The sprinkler of claim 8 wherein said means drivingly interconnecting said spur gear comprises a rotatably mounted gear member having a large diameter gear in engagement with said spur gear and a small diameter gear in engagement with the internal gears on said ring.

10. The sprinkler of claim 9 wherein said large and small diameter gears are substantially coplanar each occupying different portions of the periphery of said gear member.

11. A lawn sprinkler head comprising a hollow head member, conduit means for supporting said head member for rotation about a vertical axis and for carrying water to the hollow interior of said head member, a pair of spray members adjustably mounted on said head in fluid communication with the interior of said head member, an adjustment ring having a cylindrical outer wall and an inward extending top flange, a control knob supported on said head member for rotation with respect thereto and positioned in engagement with said flange, said head and said flange supporting said ring for rotation relative to said head, first means interconnecting said knob and said ring and second means interconnecting said ring and said spray members whereby rotation of said knob with respect to said head adjustably positions said spray members.

12. The lawn sprinkler head of claim 11 wherein said control knob and said flange are provided with interengaging stop means limiting relative rotation to less than 360 degrees and cooperating indicia on said knob and said flange to indicate the size of the spray pattern for which said spray members are adjusted.

13. The lawn sprinkler head of claim 11 wherein said control knob includes a flange overlying an annular shoulder on said ring flange to retain said ring and support it for rotation.

14. The lawn sprinkler head of claim 13, said first means interconnecting said knob and said ring comprises a gear member having a downwardly extending boss received in a recess in said head member to support it for rotation thereon, said gear member being retained in assembled position on said head member by said knob and said ring, and gears on said knob and ring in engagement with said gear member.

15. A lawn sprinkler head comprising a hollow head member, conduit means for supporting said head member for rotation about a vertical axis and for carrying water to the hollow interior of said head member, a pair of elongated spray tubes each having spray orifices along one side thereof, bearing means supporting each of said spray tubes in said head for adjustable positioning about an axis extending lengthwise of each said tube, control means connected to gear means on said tubes externally of said hollow head member for rotating each of said tubes simultaneously through an angle of less than 90 degrees about its respective axis, interengaging retaining shoulders on each said spray tube and said head member restraining said spray tubes against axial movement out of said bearing means, said interengaging shoulders being disengaged for disassembly of said spray tubes by rotation of spray tubes past the range of angular positioning by said control means.

References Cited by the Examiner
UNITED STATES PATENTS

| | | | |
|---|---|---|---|
| 2,407,322 | 9/1946 | Morrison | 74—471 |
| 2,591,073 | 4/1952 | Jepson | 239—262 |

M. HENSON WOOD, Jr., *Primary Examiner.*

EVERETT W. KIRBY, *Examiner.*